United States Patent [19]
Oku et al.

[11] Patent Number: 5,352,259
[45] Date of Patent: Oct. 4, 1994

[54] METHOD OF MANUFACTURING OPTICAL FIBER PREFORM

[75] Inventors: Masato Oku; Noritsugu Enomoto; Hiroshi Hihara; Tsuguo Sato; Kazuaki Yoshida; Takayuki Morikawa; Takeshi Yagi, all of Tokyo, Japan

[73] Assignee: The Furukawa Electric Co., Ltd., Tokyo, Japan

[21] Appl. No.: 10,670

[22] Filed: Jan. 28, 1993

[30] Foreign Application Priority Data

| Jan. 30, 1992 | [JP] | Japan | 4-040237 |
|---|---|---|---|
| Jul. 31, 1992 | [JP] | Japan | 4-205651 |
| Jul. 31, 1992 | [JP] | Japan | 4-205653 |
| Jul. 31, 1992 | [JP] | Japan | 4-205654 |
| Jul. 31, 1992 | [JP] | Japan | 4-205655 |
| Jul. 31, 1992 | [JP] | Japan | 4-205656 |
| Oct. 19, 1992 | [JP] | Japan | 4-280175 |

[51] Int. Cl.⁵ ............................................. C03B 19/09
[52] U.S. Cl. .............................. 65/412; 65/144; 65/427; 65/17.6; 65/17.3
[58] Field of Search .............. 65/3.11, 13, 18.1, 18.4, 65/144, 54, 102, 104

[56] References Cited

U.S. PATENT DOCUMENTS

| 4,501,601 | 2/1985 | Haupt . | |
|---|---|---|---|
| 4,761,390 | 8/1988 | Hartnett | 501/152 |
| 5,049,175 | 9/1991 | Röss et al. . | |
| 5,078,768 | 1/1992 | Aggarwal et al. . | |
| 5,185,020 | 2/1993 | Satoh | 65/3.11 |

FOREIGN PATENT DOCUMENTS

| 0511621A1 | 11/1992 | European Pat. Off. . | |
|---|---|---|---|
| 3217965A1 | 11/1983 | Fed. Rep. of Germany . | |
| 3240355C1 | 11/1983 | Fed. Rep. of Germany . | |
| 61-256937 | 11/1986 | Japan . | |
| 63-55132 | 3/1988 | Japan . | |
| 2129418 | 5/1984 | United Kingdom | 65/3.11 |

OTHER PUBLICATIONS

Glastechnische Berichte, vol. 60, No. 3, Frankfurt, Germany, pp. 79–82, Dorn et al., "Glass Fibres from Mechanically shaped preforms".
Patent Abstracts of Japan, vol. 11, No. 267 (C-443)(2714) Aug. 28, 1987 & JP-A-62 65 947 (Tatsuta Electric Wire & Cable Co., Ltd.) Mar. 25, 1987.

Primary Examiner—W. Gary Jones
Assistant Examiner—John M. Hoffmann
Attorney, Agent, or Firm—Frishauf, Holtz, Goodman & Woodward

[57] ABSTRACT

The present invention provides a method of manufacturing an optical fiber preform having the steps of disposing a rod member made of a silica-based material within a cavity of a mold, followed by loading a molding material within the mold cavity, and applying pressure to the mold from the outside to form a porous layer on the surface of the rod member and, thus, to obtain a porous preform, wherein at least one end portion of the rod member extends outside the mold cavity in the step of applying pressure to the mold. The particular method permits manufacturing a high quality porous preform free from splits or cracks, making it possible to obtain a high quality optical fiber preform free from residual bubbles.

3 Claims, 11 Drawing Sheets

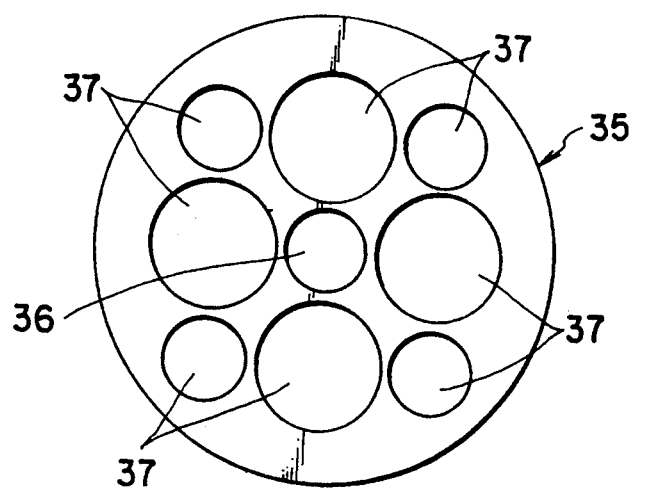
F I G. 3
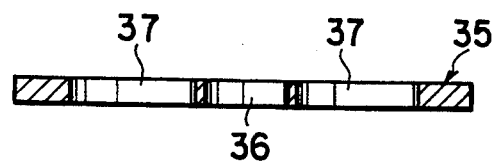
F I G. 4
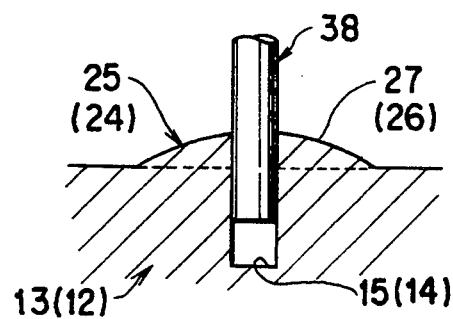
F I G. 5

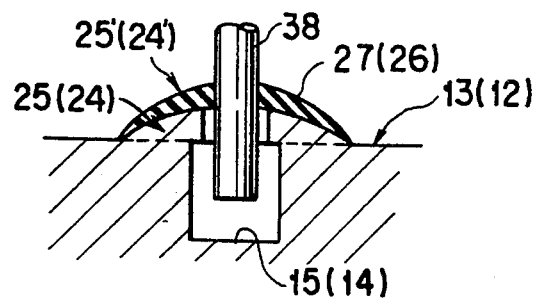
F I G. 6
F I G. 7
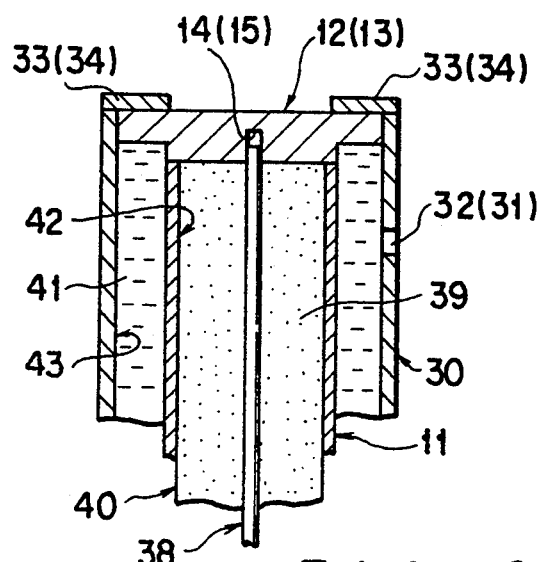
F I G. 8

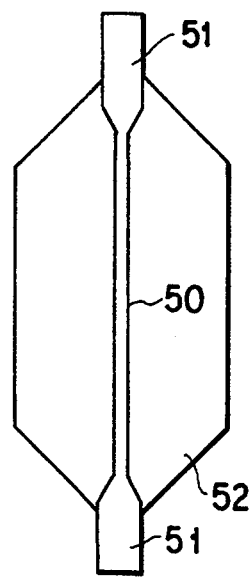
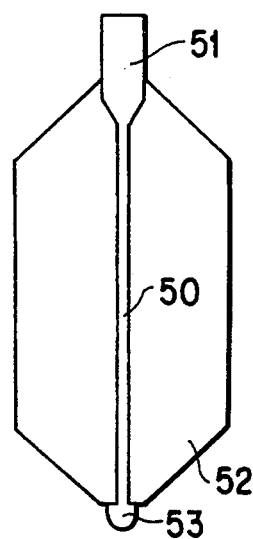
FIG. 9A    FIG. 9B
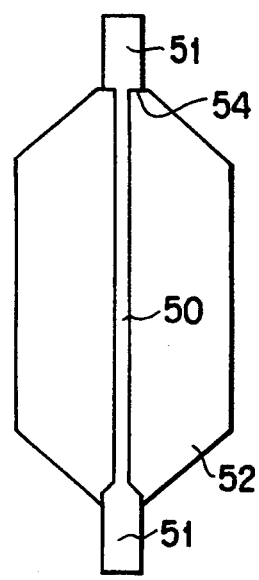
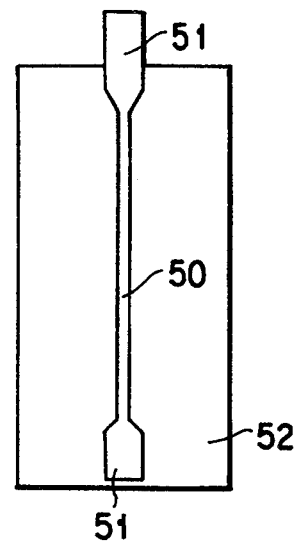
FIG. 9C    FIG. 9D

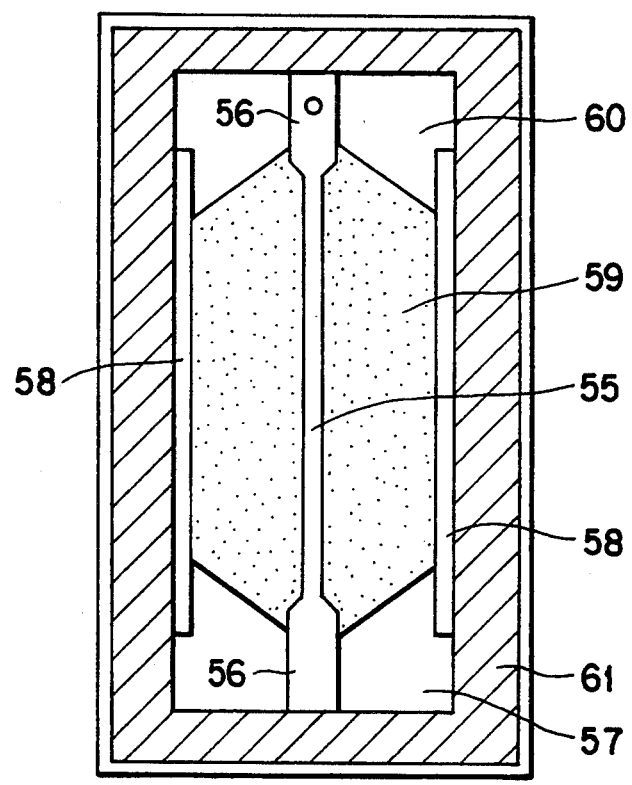
F I G. 10

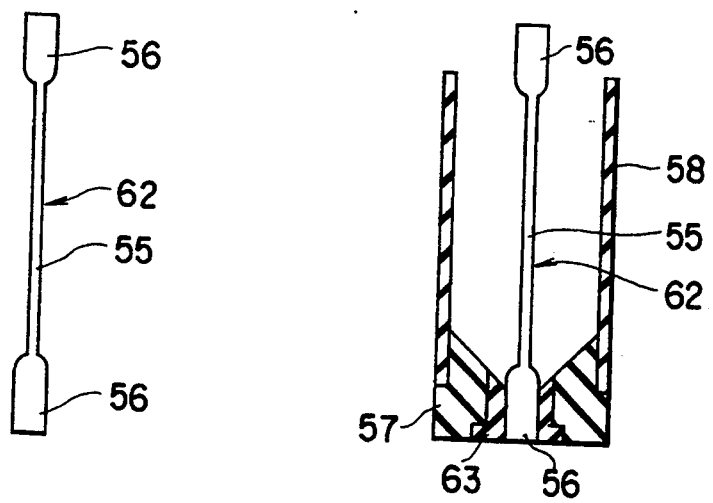
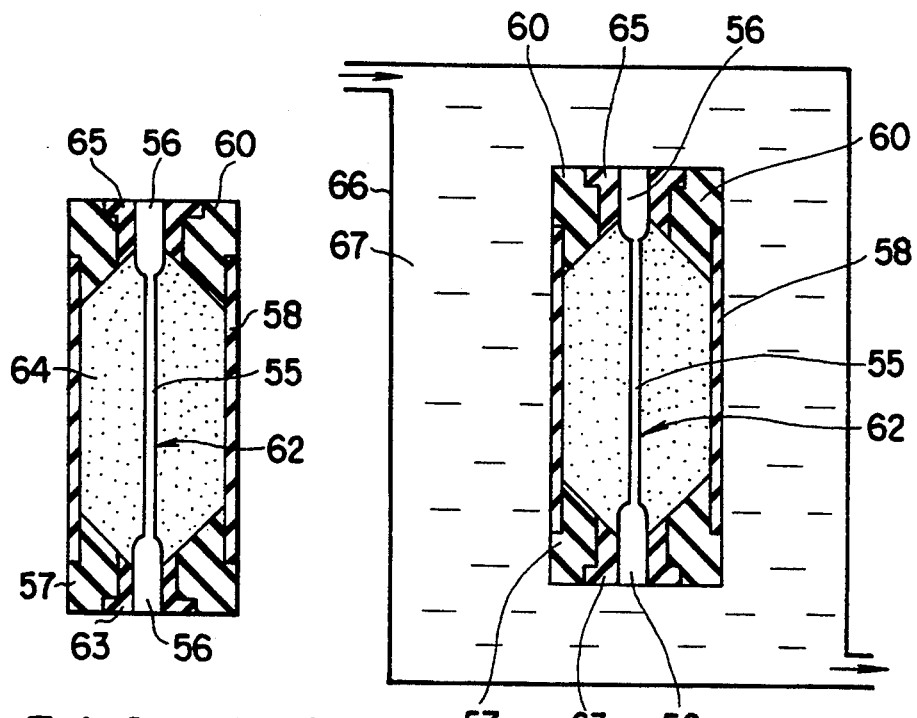
FIG. 11A   FIG. 11B
FIG. 11C   FIG. 11D

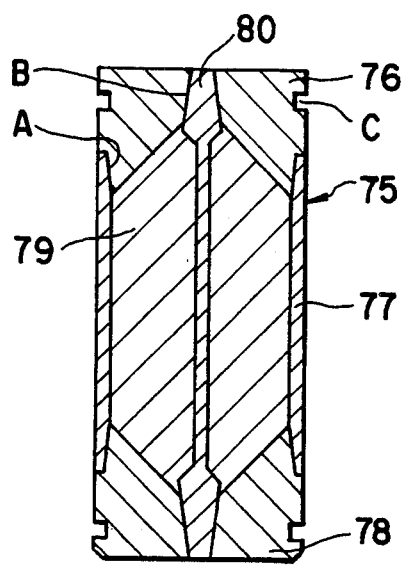
F I G. 14
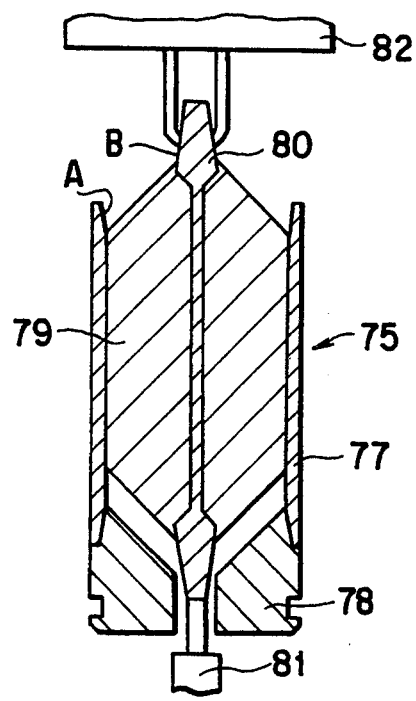
F I G. 15

METHOD OF MANUFACTURING OPTICAL FIBER PREFORM

BACKGROUND OF THE INVENTION

1. Field of the Invention

The present invention relates to a method of manufacturing a preform of an optical fiber used in the field of communication and optical devices.

2. Description of the Related Art

A rod-in-tube method is known to the art as a method of manufacturing an optical fiber preform.

In the rod-in-tube method, a glass rod acting as a core is inserted into a glass tube acting as a cladding. Under this condition, the assembly of the glass tube and the glass rod is heated to cause fusion so as to form an integral body. In the conventional method, however, the glass tube and the glass rod tend to be collapsed in the heating step for fusion, with the result that bubbles tend to remain in the manufactured optical fiber preform. It follows that the optical fiber prepared by drawing the defective optical fiber preform becomes brittle and is low in reliability.

Vigorous researches are being made in an attempt to develop a hydrostatic pressing method which can be used in place of the rod-in-tube method. In this case, a porous preform is prepared by forming a porous clad body by the hydrostatic pressing method on the outer surface of a glass rod acting as a core, followed by dehydrating and sintering the porous preform to form a transparent glass clad layer and, thus, to obtain an optical fiber preform. The hydrostatic pressing method is disclosed in, for example, Published Unexamined Japanese Patent Application Nos. 59-19891 and 61-256937.

In the case of employing the hydrostatic pressing method, a rod body acting as a core such as a glass rod made of, for example, a silica-based material, is put in a mold made of an elastic material. Further, a molding material containing a silica-based powder as a main raw material is loaded around the rod body. Under this condition, the mold is pressurized from outside the mold by a liquid pressure so as to form a porous layer on the surface of the glass rod and, thus, to obtain a porous preform consisting of the core glass rod and the porous clad layer. Then, the porous preform is taken out of the mold, followed by applying drying, degreasing, dehydrating and sintering treatments to the porous preform so as to obtain an optical fiber preform.

Where a porous layer is formed on the surface of a glass rod by the hydrostatic pressing method, a compressing load of about 1.5 tons/cm$^2$ is applied toward the center of the mold for about 1 to 50 minutes. What should be noted is that the compressing load fails to be applied uniformly to the powdery molding material. As a result, the porous layer formed on the glass rod surface is deformed. It follows that the porous layer fails to be concentric with the glass rod. Alternatively, the glass rod is broken. Particularly, the glass rod breakage is increased with decrease in the diameter of the glass rod. What should also be noted is that the impact produced by the breakage of the glass rod causes the formed porous layer to be cracked or split.

In the conventional method of manufacturing an optical fiber preform, a taper finishing treatment is applied to the end portions of the porous layer such that the outer diameter of the porous layer is diminished toward the edges thereof. The taper finishing treatment is intended to perform smoothly the after-treatments of the porous layer such as the sintering treatment and to prevent the end portions of the porous layer from being broken during handling of the preform.

In applying a taper finishing treatment to the porous layer formed on the glass rod core, the porous preform is disposed in a mold in which ring-like tools for forming the end portions, each having a tapered inner circumferential surface, are disposed in portions corresponding to the end portions of the porous preform. Under this condition, a predetermined liquid pressure is applied to the porous layer. In this molding step, a nonuniformity takes place in the loading density of the molding material such as the silica-based powder in the end portions within the mold, or an air fails to be removed sufficiently in the end portions, resulting in failure to obtain a porous preform of a high quality.

The difficulty described above is derived from the behavior of the molding material in the compression molding step. For example, the glass rod receives a compressing loaded in the radial direction of the mold cavity in the molding step, giving rise to slippage in the axial direction of the glass rod. Since the movement of the glass rod is restricted within the mold, the load is applied nonuniformly to the glass rod. As a result, the stress is locally concentrated on the glass rod. For example, the stress is concentrated in the central portion or both end portions in the longitudinal direction of the glass rod, giving rise to the breakage problem described above.

What should also be noted is that the end portions of the mold have a mechanical strength higher than that in the central portion. Naturally, the porous layer formed in the end portion of the mold is less likely to be deformed than the porous layer formed in the central portion of the mold. Further, the molding material is less likely to be moved in the end portion of the mold than in the central portion. It follows that, when the molding material is pressurized within the mold, the molding material is sufficiently pressurized in the central portion of the mold and moved toward the end portion. In the end portion of the mold, however, the porous layer is unlikely to be deformed. Also, the molding material is unlikely to be moved in the end portion of the mold. Under the circumstances, the loading density of the molding material becomes nonuniform, and air removal from within the mold becomes insufficient.

As described above, in the conventional hydrostatic pressing method, a porous layer is formed on the surface of a core rod member by the hydrostatic pressing method, followed by applying a purification and sintering treatment to the resultant porous preform so as to manufacture a preform for an optical fiber. In this technique, however, the yield of the optical fiber preform is low.

SUMMARY OF THE INVENTION

An object of the present invention is to provide a method of manufacturing a preform for an optical fiber, which permits preparing a porous preform free from splits and cracks and also permits manufacturing a high quality preform for an optical fiber with a high efficiency, the preform being free from residual cells.

According to the present invention, there is provided a method of manufacturing an optical fiber preform, comprising the steps of disposing a rod member made of a silica-based material within a cavity of a mold, followed by loading a molding material within the mold cavity; applying pressure to the mold from the outside to form a porous layer on the surface of the rod member and, thus, to obtain a porous preform; and successively applying a purification treatment and a sintering treatment to the porous preform taken out of the mold so as to obtain an optical fiber preform, wherein at least one end portion of the rod member is allowed to project outside the mold cavity in the step of applying pressure to the mold.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 3 and 4 collectively exemplify a center holding tool used in the method of the present invention;

FIGS. 5 and 6 collectively show a gist portion in another embodiment of a mold cavity used in the method of the present invention;

FIG. 7 exemplifies an end portion molding tool used in the method of the present invention;

FIGS. 8, 14, 18 and 20 show the methods according to other embodiments of the present invention;

FIGS. 9A to 9D show porous preforms used in the method of the present invention;

FIGS. 10 and 16 show apparatuses each used in the method of the present invention;

FIGS. 11A to 11D collectively show the steps of forming a porous preform by a method according to another embodiment of the present invention;

FIG. 15 shows how the porous preform is taken out of the mold in the method shown in FIG. 14;

DETAILED DESCRIPTION OF THE PREFERRED EMBODIMENTS

Let us describe some embodiments of the present invention with reference to the accompanying drawings.

EXAMPLE 1

Figure 1:
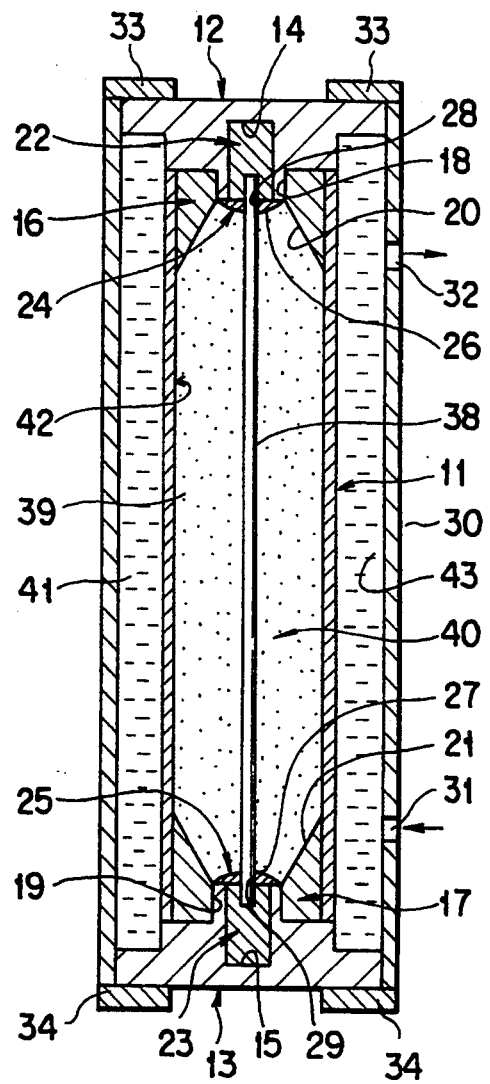
FIGS. 1 and 2 collectively illustrate a method according to one embodiment of the present invention.
Figure 2:
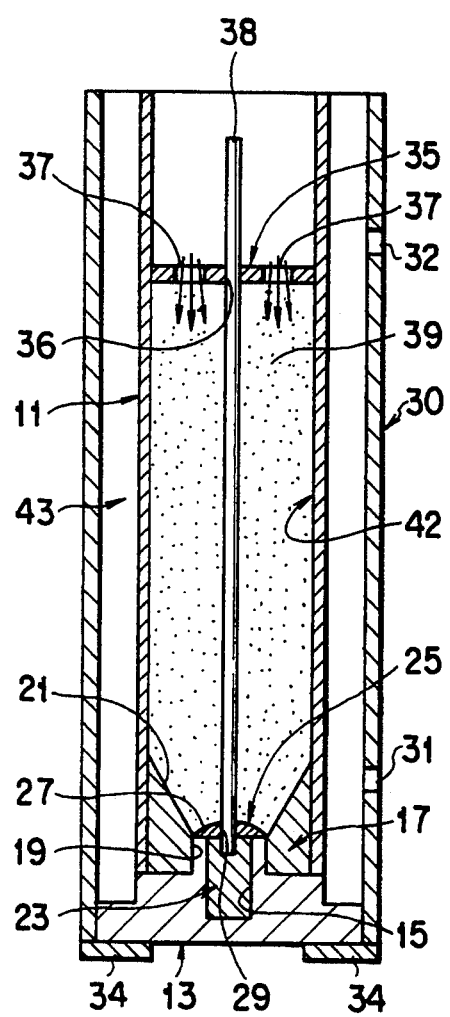

FIGS. 1 and 2 collectively exemplifies a CIP (Cold Isostatic Pressing) molding apparatus used in a method of the present invention. A reference numeral 11 shown in these drawings denotes a cylindrical mold made of an elastic material such as rubber or a plastic material. The members shown in the drawings comprise a pair of molding lid bodies 12 and 13, a pair of tools 16 and 17 for forming end portions, stress absorbing members 22 and 23, a pair of end face forming tools 24 and 25, a pressure resistant vessel 30, a center holding tool 35, a rod body 38, a molding material 39, a porous layer 40, and a pressure transmitting medium 41.

Each of the molding lid bodies 12 and 13 is in the form of a disc having a plurality of steps formed on the outer surface. Concave portions 14 and 15 for moderating the stress are formed in the central portions of these molding lid bodies 12 and 13, respectively. These molding lid bodies are formed of a metal. Alternatively, rubber or a plastic material having a rigidity substantially equal to that of the metal is used for forming these molding lid bodies 12 and 13. It is possible for at least one of these molding lid bodies to be provided with a through-hole extending in the thickness direction for sucking the air from within a mold cavity described later.

The end portion forming tools 16, 17 are of a ring-shape and comprises circular holes 18, 19 and tapered inner surfaces 20, 21, respectively. These end portion forming tools 16, 17 are formed of a material equal to that used for forming the molding lid bodies 12, 13.

The stress absorbing members 22, 23 are made of an optional material capable of a plastic deformation or an elastic deformation. For example, these stress absorbing members 22 and 23 are formed in the shape of a column or a coil using a rubber, a plastic material including a foam or a metal including a spring member such that these end portion forming tools can be housed in the concave recesses 14 and 15, respectively.

The end face forming tools 24 and 25 are in the shape of a disc and have protruding surfaces 26, 27 on one side, respectively. Each of these protruding surfaces is hemispherical or conical. Further, through-holes 28 and 29 are formed in the central portions of these end portion forming tools 24 and 25, respectively. A material equal to that used for forming the molding lid bodies is also used for forming these end portion forming tools 24, 25. As described later, these end face forming tools 24, 25 are capable of supporting the rod member 38 because the rod member 38 is engaged with the through-holes 28, 29.

The pressure resistant vessel 30 is provided by a metal cylinder having an inlet port 31 and an outlet port 32 of the pressure transmitting medium 41. These inlet port and outlet port are formed in the side wall of the metal cylinder. Support members 33 and 34 are mounted to the upper and lower ends, respectively, of the pressure resistant vessel 30. As described later, a supply system (not shown) and a discharge system (not shown) of the pressure transmitting medium 41 are connected, respectively, to the inlet port 31 and the outlet port 32 of the pressure resistant vessel 30.

As shown in FIGS. 3 and 4, a hole 36 for the rod member is formed in the central portion of the center holding tool 35, which is in the form of a disc. Also, a plurality of holes 37 through which a powdery molding material is supplied are formed around the hole 36. A metal, rubber, plastic material, etc. can be used for forming the center holding tool 35.

The rod member 38 is prepared by dehydrating and sintering a porous body made of a silica powder prepared by, for example, a vapor phase reaction method, a slip casting method, a sol-gel method, a slurry coat-ing method, or a powder pressing. The powder pressing employed for preparing the porous body includes, for example, a dry molding method such as a pressurizing method disclosed in Japanese Patent Application No. 2-244817, or an MSP method described in "Journal of Optical Communications", Vol. 10, No. 1, pages 2–5, 1989), and a wet molding method such as a cast molding method disclosed in Published Unexamined Japanese Patent Application No. 64-56331 or an extrusion method disclosed in Japanese Patent Application No. 2-24481. The rod member 38 may consist of a core material alone. Alternatively, the rod member 38 may consist of a core and a clad partially formed on the surface of the core material.

The molding material 39 used for preparing the porous layer 40 consists of a silica-based powder. For example, a silica powder which may or may not contain a dopant can be used as the molding material 39. The silica-based powder used as the molding material 39 in the present invention should have an average particle diameter of about 0.01 micron to 100 microns in general. Where the silica-based powder is excessively fine, it is difficult to load the powder in the cavity 42 of the mold. In this case, it is desirable to granulate the fine powder to prepare grains having an average diameter of 50 microns to 100 microns by using a solvent such as a pure water. The granulation permits the silica-based powder to be loaded uniformly in the cavity with a high density. It is desirable for the powder to contain at least 50% of grains having a diameter of at least 50 microns and at most 10% of a powder having a diameter smaller than 10 microns. It is also possible to add a pure water to the molding material 39 to prepare a sol. Further, organic materials such as polyvinyl alcohol, polyvinyl butyral, polyethylene glycol, methyl cellulose, carboxymethyl cellulose, ethyl cellulose, hydroxypropyl cellulose or glycerin may be added as a molding aid to the silica-based powder in addition to the solvent. The amount of the molding aid added to the silica-based powder should be about 1 to 20% by weight, preferably 1 to 15% by weight, based on the amount of the silica-based powder.

As described later, the pressure transmitting medium 41 is supplied to a pressuring space 43. For example, a pure water or a lubricating oil is used as the pressure transmitting medium.

Let us describe more in detail each of the members of the molding apparatus shown in FIGS. 1 and 2. First of all, each of the molding lid bodies 12 and 13, each having a stepped portions on the outer surface, has a large diameter portion, an intermediate diameter portion, and a small diameter portion. Each of these molding lid bodies can be hermetically engaged with the pressure resistant vessel 30 at the large diameter portion. The intermediate diameter portions of these molding lid bodies 12, 13 are capable of abutment at the end faces with the end faces of a molding cylinder 11. Further, the small diameter portions of these molding lid bodies can be hermetically engaged with the circular holes 18, 19 of the end portion forming tools 16, 17, respectively, and are capable of abutment at the end faces with the end face forming tools 24, 25.

Each of the end portion forming tools 16 and 17 can be hermetically engaged with the molding cylinder 11. On the other hand, the end face forming tools 24, 25 abut against the end faces at the small diameter portions of the end portion forming tools 16, 17. Further, both end portions of the rod member 38 are engaged with the through-holes 28, 29.

These molding cylinder 11, molding lid bodies 12, 13, end portion forming tools 16, 17, and end face forming tools 24, 25 are assembled within the pressure resistant vessel 30 as shown in FIG. 1. In this case, a mold cavity 42 is defined by the molding cylinder 11, the end portion forming tools 16, 17, and the end face forming tools 24, 25. Also, a pressurizing space 43 is defined between the molding lid bodies 12, 13 and the pressure resistant vessel 30. It should be noted that a coating of, for example, a fluorine resin, is applied to each of the molding lid bodies 12, 13, the end portion forming tools 16, 17, the end face forming tools 24, 25, and the center holding tool 35 so as to prevent an impurity from entering the porous layer 40. The coating need not be applied to the molding cylinder 11 because the porous layer 40 is not contaminated by the molding cylinder 11. Also, the coating need not be applied to the pressure resistant vessel 30 which is not directly involved in the formation of the cavity 42. Further, a seal member is used as required for achieving a high air-tightness and liquid-tightness in assembling the members of the mold.

The porous layer 40 consisting of a silica-based powder is formed to cover the outer surface of the rod member 38 by using the apparatus of the construction described above. Before the molding step, stress absorbing members 22 and 23 are loaded in the stress moderating concave portions 14, 15 formed in the molding lid bodies 12, 13, respectively. As shown in FIG. 2, the molding lid body 13, the end portion forming tool 17, and the end face forming tool 25 are assembled in a predetermined order in the lower portion within the pressure resistant vessel 30 having a holding member 34 mounted thereto, followed by arranging the rod member 38 within the cavity 42. In this case, the lower portion of the rod member 38 is inserted through the through-hole 25 made in the end face forming tool 25 into the stress moderating concave portion 15 of the molding lid body 13 so as to be held in the center of the cavity 42. In order to ensure the inserted state of the rod member, a center holding tool 35 is temporarily mounted in the upper portion of the cavity 42 such that the upper portion of the rod member 38 extends through a rod member-holding hole 36 of the center holding tool 35. The center holding tool 35 is supported by a suitable hanging means. In this case, the hanging means serves to hold the center holding tool 35 at a predetermined position within the cavity 42 or to support the center holding tool 35 rotatably or movably in the vertical direction.

In the next step, the molding material 39, which is subjected to a deaeration treatment in advance, is put within the mold cavity 42. The molding material 39 drops downward through holes 37 made in the center holding tool 35 so as to be deposited to have the rod member 38 buried therein. Where the center holding tool 35 is supported rotatably or movably in the vertical direction within the mold cavity 42, the center holding tool 35 is rotated in synchronism with the supply of the molding material 39 into the mold cavity 42, and is moved upward in accordance with increase in the deposited amount of the molding material within the mold cavity 42. If the center holding tool 35 is kept rotated during the supply of the molding material into the mold cavity 42, it is possible to load the molding material 39 uniformly within the cavity 42.

When the rod member 38 is stably supported with increase in the loading amount of the molding material within the mold cavity 42, the center holding tool 35 is removed from within the mold cavity 42, followed by further supplying the molding material 39 to fill the cavity 42. After the cavity 42 is loaded with a predetermined amount of the molding material 39, the molding lid body 12, the end portion forming tool 16 and the end face forming tool 24 are assembled in a predetermined order, followed by mounting the holding member 33 to the upper end of the pressure resistant vessel 30.

In the next step, a lubricating oil acting as the pressure transmitting medium 41 is supplied into the pressurizing space 43 through a supply system (not shown) connected to the inlet port 31 formed in the side wall of the pressure resistant vessel 30. Before the supply of the pressure transmitting medium, the air within the mold cavity 42 is discharged by a vacuum pump (not shown) connected to the suction hole of the molding lid body 13 (or 12). After the pressure transmitting medium has been supplied to the pressurizing space 43, the molding cylinder 11 is pressurized from the outside. As a result, the porous layer 40 having a uniform bulk density and free from splits and cracks is formed to cover the rod member 38 without breaking the rod member 38.

Then, the pressure transmitting medium 41 within the pressurizing space 43 is gradually discharged to the outside through a discharge system (not shown) connected to the outlet port 32 of the pressure resistant vessel 30, followed taking out any of the molding lid bodies 12 and 13 through the end portion of the pressure resistant vessel 30. Further, the porous preform having the porous layer 40 formed on the surface of the rod member 38 is taken out of the mold cavity 42.

As described above, in the method of the present invention, a rod member acting as a core of an optical fiber is put in a mold cavity, followed by loading a molding material including a silica-based powder around the rod member. Then, the mold is pressurized from the outside so as to prepare a porous preform. Further, a degreasing treatment, purification (include dehydrating) treatment and a sintering treatment are applied by the ordinary method to the porous preform so as to obtain a desired preform of an optical fiber.

In the present invention, the end portion of the rod member is allowed to project outside the mold cavity, with the result that the movement of the rod member is not restricted within the mold cavity. It follows that, even if an excessive molding pressure is applied to the rod member through the molding material, the rod member is moved in its axial direction and, thus, the stress applied to the rod member is moderated. Such being the situation, the breakage of the rod member need not be worried about in the molding step of the porous layer. Naturally, the splitting or cracking derived from the breakage of the rod member is unlikely to take place.

For allowing the end portion of the rod member to project outside the mold cavity, it is desirable to form a concave portion adjacent to at least one side of the mold cavity such that the end portion of the rod member is inserted into the concave portion. In this case, a problem is not generated even in the event of breakage of the rod member.

It should also be noted that the end portion of the mold cavity expands toward the inner region of the cavity. For example, the the end portion has a semicircular, hemispherical or conical cross sectional shape. As a result, when the molding material within the cavity has received a molding pressure, the molding material is smoothly moved along the expanding surface of the cavity. Thus, the loading density of the molding material is made uniform in the end portion of the mold cavity. In addition, deaeration can be achieved sufficiently. It follows that the molding material is molded with a uniform molding pressure.

In this embodiment, it is possible to use the molding lid bodies 12, 13 and the end face forming tools 24, 25, which are constructed as shown in FIGS. 5 and 6. In the structure shown in FIG. 5, the molding lid body 13 is formed integrally with the end face forming tool 25. On the Other hand, in the structure shown in FIG. 6, an additional end face forming tool 25' is allowed to abut against the end face forming tool 25 formed integrally with the molding lid body 13. This is also the case with the relationship between the molding lid body 12 and the end face forming tool 24. Of course, a reference numeral 24' shown in FIG. 6 denotes the additional end face forming tool. These modifications are applicable to the case where the projecting surfaces 26, 27 are hemispherical or conical.

FIG. 7 shows the end face forming tool 24 (or 25) which does not have a protruding surface 26 (or 27). Of course, the end face forming tool shown in FIG. 7 can also be used in the molding apparatus used in the present invention. It should also be noted that, where the end face forming tools 24, 25 elastically hold the rod member 38, the stress absorbing members 22, 23 need not be mounted within the concave portions 14, 15.

The molding means described below can also be employed in the method of the present invention. First of all, the concave portion 14 or 15 is formed in one end portion alone of the cavity 42, and one end portion alone of the rod member 38 is inserted into the concave portion for the molding operation. In other words, one end portion alone of the rod member 38 is allowed to project outside the mold cavity for carrying out the molding operation. What should also be noted is that one end portion alone of the mold cavity 42 is simultaneously allowed to expand in a predetermined direction by the protruding surface 26 or 27 for carrying out the molding operation. Of course, prominent effects as desired can be produced in each of these modifications.

FIG. 8 shows a molding apparatus used for working the method according to another embodiment of the present invention. The apparatus shown in FIG. 8 is substantially equal to that shown in FIGS. 1 and 2, except that a pair of end portion forming tools 16, 17 and a pair of end face forming tools 24, 25 are omitted in the apparatus shown in FIG. 8. A prominent effect of the present invention can be produced in the case of forming a porous layer 40 on the outer surface of the rod member 38 by using the molding apparatus shown in FIG. 8.

EMBODIMENT 1

Let us describe a specific embodiment covering the case of using the CIP (Cold Isostatic Pressing) apparatus shown in FIGS. 1 and 2.

Used was a core rod member 38 formed of a $SiO_2$-$GeO_2$ series glass material having an outer diameter of about 13 mm and a length of about 330 mm, which had been prepared by a VAD (Vapor-phase Axial Deposition) method. Silica grains having an average grain diameter of 60 microns, which had been prepared by granulating a silica powder having an average particle diameter of 1 micron, was used as the molding material 39. The molding cylinder 11 was 110 mm in outer diameter, 100 mm in inner diameter, and 330 mm in length was formed of a silicone rubber. The mold cavity 42 defined by the molding cylinder 11 and the molding lid bodies 12, 13 had an effective length (height) of about 275 mm.

Each of the molding lid bodies 12 and 13 was sized to conform with the molding cylinder 11. Concave portions 14, 15 each having a diameter of 20 mm and a depth of 20 mm were formed in the inner surfaces of the molding lid bodies 12, 13, respectively. Sponge bodies having a cushioning property were disposed as the stress absorbing members 22, 23 within these concave portions 14, 15, respectively. Further, the protruding planes 26, 27 of the end face forming tools 24, 25 formed bent surfaces.

In the first step, the rod member 38 was disposed within the mold cavity 42, followed by loading a predetermined amount of the molding material 39 in the mold cavity and subsequently closing the upper end of the mold cavity 42. Then, the pressure transmitting medium (lubricating oil) 41 was poured into the pressurizing space 43, followed by pressurizing the molding cylinder 11 with a pressure of 1500 kgf/cm$^2$ for about 2 minutes. As a result, formed was the porous layer 40 having an outer diameter of about 86 mm and a length of about 275 mm. The bulk density of the porous layer thus formed was found to be uniform. Also, the porous layer was free from cracks or splits. Further, no breakage was recognized in the rod member 38.

After formation of the porous layer 40, the pressure transmitting medium 41 was gradually released from within the pressurizing space 43 over a period of about 30 minutes, followed by removing the molding lid body 12 and subsequently taking out the porous preform consisting of the rod member 38 and the porous layer 40 formed on the rod member 38 from within the mold cavity 42.

In the next step, the porous preform was refined under an atmosphere containing $Cl_2$ and He at 1250° C. so as to remove the impurities and water from the porous preform, followed by applying a sintering treatment to the porous preform at 1660° C. under a helium gas atmosphere so as to obtain a preform for an optical fiber. The optical fiber preform thus prepared was found to be about 70 mm in outer diameter and about 270 mm in length. Further, bubbles were not recognized at the interface between the core and the cladding layer.

The optical fiber preform thus obtained was drawn by a known drawing method under heating so as to prepare an optical fiber having a core diameter of 10 microns and a cladding diameter of 125 microns. Immediately after the drawing step, the circumferential surface of the optical fiber was coated with an ultraviolet-curing resin to form a coating layer having an outer diameter of 400 microns. The coated optical fiber thus prepared was found to be substantially equal in optical properties to an optical fiber manufactured by a vapor phase method.

EMBODIMENT 2

The molding for forming the porous layer 40 was carried out as in Embodiment 1, except that the molding cylinder 11, the molding lid bodies 12, 13, the end portion forming tools 16, 17, and the end face forming tools 24, 25 included in the molding apparatus used were constructed as shown in FIG. 6, and that the molding pressure was set at 1400 kgf/cm$^2$. Also, each of the end face forming tools 24', 25' used in Embodiment 2 was formed of a silicone rubber. As a result, formed was the porous layer 40 having an outer diameter of about 86 mm and a length of about 275 mm. The bulk density of the porous layer thus formed was found to be uniform. Also, the porous layer was free from cracks or splits. Further, no breakage was recognized in the rod member 38.

After formation of the porous layer 40, the pressure transmitting medium 41 was gradually released from within the pressurizing space 43 over a period of about 30 minutes, followed by removing the molding lid body 12 and subsequently taking out the porous preform consisting of the rod member 38 and the porous layer 40 formed on the rod member 38 from within the mold cavity 42.

The porous preform thus prepared was refined and, then, sintered as in Embodiment 1 so as to obtain a preform for an optical fiber, followed by manufacturing a resin-coated optical fiber as in Embodiment 1. The resin-coated optical fiber thus obtained was found to be substantially equal in optical properties to the resin-coated optical fiber obtained in Embodiment 1.

EMBODIMENT 3

Used was a rod member 38 formed of $SiO_2$ and having an outer diameter of about 7.8 mm and a length of about 330 mm, which had been prepared by a VAD method. Silica grains having an average grain diameter of 60 microns, which had been prepared by granulating a silica powder having an average particle diameter of 0.5 micron, was used as the molding material 39. The molding cylinder 11 was 60 mm in outer diameter, 50 mm in inner diameter, and 270 mm in length was formed of a silicone rubber.

Each of the molding lid bodies 12 and 13 was sized to conform with the molding cylinder 11. Concave portions 14, 15 each having a diameter of 9 mm and a depth of 20 mm were formed in the inner surfaces of the molding lid bodies 12, 13, respectively. Stress absorbing members 22, 23 equal to those used in Embodiment 1 were disposed within these concave portions 14, 15, respectively. The end portion forming tools 16, 17 and the end face forming tools 24, 25 were sized to conform with the other members described above. The protruding surfaces 26, 27 of the end face forming tools 24, 25 were formed conical. Further, the effective length (height) of the mold cavity 42 defined between the molding cylinder 11 and the molding lid bodies 12, 13 was about 245 mm.

The porous layer 40 was formed by using the apparatus of the construction described above as in Embodiment 1, except that the molding pressure was set at 1000 kgf/cm$^2$. As a result, formed was the porous layer having an outer diameter of about 43 mm and a length of about 245 mm. The bulk density of the porous layer thus formed was found to be uniform. Also, the porous layer was free from cracks or splits. Further, no breakage was recognized in the rod member 38.

After formation of the porous layer 40, the porous preform consisting of the rod member 38 and the porous layer 40 formed on the rod member 38 was taken out of the mold cavity 42 as in Embodiment 1. Then, the rod member 38 was withdrawn from the porous preform, followed by inserting a core rod member formed of $SiO_2$-$GeO_2$ series material into the resultant hole in the porous preform. The rod member thus inserted had been prepared by a VAD method and was about 7.8 mm in outer diameter and about 300 mm in length.

The porous preform thus prepared was refined and, then, sintered as in Embodiment 1 so as to obtain a preform for an optical fiber having an outer diameter of about 36 mm and a length of about 240 mm, followed by manufacturing a resin-coated optical fiber as in Embodiment 1. The resin-coated optical fiber thus obtained was found to be substantially equal in optical properties to the resin-coated optical fiber obtained in Embodiment 1.

EMBODIMENT 4

A porous preform was prepared as in Embodiment 1, except that the rod member 38 and the molding material 39 used were equal to those used in Embodiment 3 and the type of the molding apparatus used was equal to that in Embodiment 2. The bulk density of the porous layer 40 thus formed was found to be uniform. Also, the porous layer was free from cracks or splits. Further, no breakage was recognized in the rod member 38.

The porous preform thus prepared was refined and, then, sintered as in Embodiment 1 so as to obtain a preform for an optical fiber, followed by manufacturing a resin-coated optical fiber as in Embodiment 1. The resin-coated optical fiber thus obtained was found to be substantially equal in optical properties to the resin-coated optical fiber obtained in Embodiment 1.

In any of Embodiments 1 to 4 described above, it was possible to suppress the probability of the breakage of the rod member 38 at a level lower than 2%. Also, it was possible to decrease the remaining rate of the air bubbles within the porous preform by as much as about 70% based on the level in the conventional technique. Incidentally, the probability of breakage of the rod member 38 was as high as at least 95% in the conventional technique.

EXAMPLE 2

In the present invention, it is also possible to prepare a porous preform by using a rod member formed of a silica-based material and having a large diameter portion formed in at least one end portion of the rod member. In this case, a molding layer is formed to cover the circumferential surface of the rod member including the large diameter portion by using a silica-based powder so as to prepare a porous preform. Then, a sintering treatment is applied to the porous preform so as to manufacture a preform for an optical fiber.

It is possible to use a glass rod member having an optional refractive index, which is used in the conventional method of manufacturing an optical fiber, as the rod member formed of a silica-based material. It is possible for the rod member to consist of a core alone or a core and a part of cladding layer. Desirably, the rod member should consist of a core and a cladding layer partially covering the core. The shape of the large diameter portion of the rod member is not particularly restricted in the present invention.

The silica-based powder used for forming the rod member includes, for example, a silica powder prepared by the hydrolytic method of alkoxy compounds or by the waterglass method. It is also possible to use a silica powder containing a dopant serving to control the refractive index for forming the rod member. Preferably, the silica-based powder used in the present invention should be selected from the group consisting of silicon tetrachloride obtained by a flame hydrolysis method, a metal silicon powder prepared by a dry method such as a high-temperature oxidation method and grains prepared from these powdery materials.

In forming a molding layer to cover the circumferential surface of a rod member including the large diameter portion, it is possible to form a molding layer 52 in a manner to cover the large diameter portions 51 formed at the end portions of the rod member 50, as shown in FIG. 9A. It is also possible to form the molding layer 52 in a manner to cover the large diameter portion 51 formed at one end portion of the rod member 50, as shown in FIG. 9B or 9C. In this case, the other large diameter portion, which is not covered with the molding layer 52, may be provided by a projection 53, as shown in FIG. 9B. It is also possible to allow the molding layer 52 to extend to reach a stepped portion 54 formed at the edge of the large diameter portion 51 of the rod member 50, as shown in FIG. 9C. Further, the molding layer 52 may be formed to cover the entire region of one of the large diameter portions 51, as shown in FIG. 9D. Incidentally, the large diameter portions may be formed integrally with the rod member. Alternatively, a larger diameter portion prepared separately may be mounted to at least one end face of the rod member.

The molding layer may be formed to cover the circumferential surface of the rod member by, for example, a pressure molding method disclosed in Published Unexamined Japanese Patent Application No. 61-256937, an extrusion molding method disclosed in Japanese Patent Application No. 2-244815 or a slurry casting method disclosed in Published Unexamined Japanese Patent Application No. 64-56331.

The mold used for forming the molding layer 52 includes, for example, a mold disposed within a CIP molding apparatus such a dry type CIP mold comprising upper and lower lids having a supporting member of a rod member, a cylindrical rubber mold, and a metal envelope. It is also possible to use a wet type mold comprising upper and lower lids having a supporting member of a rod member and a cylindrical rubber mold. It is desirable to use a material having a high elasticity for forming the upper and lower lids and the cylindrical rubber mold, said material including, for example, a plastic material having a high elasticity and a rubber such as silicone rubber, urethane rubber or a nitrile rubber.

In the method of the present invention, used is a rod member formed of a silica-based material and having a large diameter portion formed in at least one end portion of the rod member. What should be noted is that the molding layer is formed to cover the circumferential surface of the rod member including the large diameter portion. The particular construction permits further improving the bonding strength between the rod member and the molding layer, with the result that the molding layer is prevented from being slid along the glass rod member acting as a core of the optical fiber in the subsequent degreasing step for removing the molding aid from the molding layer, the purification and dehydrating steps for removing the impurities from the molding layer and the sintering step to form a transparent glass cladding layer.

What should also be noted is that the elongation of the rod member is suppressed in the sintering step to form a transparent cladding layer, making it possible to eliminate the bubble generation around the boundary region between the rod member and the molding layer.

It is also possible to prevent the molding layer from failing to be aligned with the rod member. It follows that the optical fiber prepared by drawing the resultant optical fiber preform exhibits excellent transmission property.

EMBODIMENT 5

As shown in FIG. 10, a glass rod having a total length of 800 mm was prepared by attaching a supporting glass rod 56 having a diameter of 25 mm to each end of a core glass rod 55 having an outer diameter of 14 mm and a length of 500 mm. The core glass rod 55 was prepared by a VAD method and had a core/clad ratio of ⅓. The difference in the refractive index between the core and the clad was 0.35%.

The resultant glass rod was mounted in the center of a lower rubber lid 57 and put in a cylindrical rubber mold 58 having an inner diameter of 110 mm and a length of 800 mm (the length of a loading portion being 580 mm). Silica grains 59 having an average diameter of 80 $\mu$m were loaded in the loading portion defined between the lower rubber lid 57 and the rubber mold 58 while vibrating the mold. After an upper rubber lid 60 was mounted, a water-tight treatment was applied to the mold, followed by mounting the mold in a hydrostatic pressurizing apparatus (CIP apparatus) 61. Under this condition, a compression molding was applied so as to form a molding layer on the outer surface of the core glass rod 55 and, thus, to obtain a porous preform. The compression molding was performed under a pressure of 1.0 tons/cm$^2$ for about 1 minute. The molding pressure was gradually released over a period of about 3 minutes from 200 kgf/cm$^2$ because cracks tend to occur in the low pressure region of 200 kg/cm$^2$ or less when the molding is released from the rubber mold. The resultant porous preform was about 90 mm in outer diameter and weighed about 5 kg.

The porous preform was defatted at 600° C. under the air atmosphere, followed by purification (including dehydration) the preform at 1250° C. under a helium gas atmosphere containing about 1% of chlorine. Further, the preform was sintered at 1600° C. under a helium gas atmosphere to obtain a preform for an optical fiber. Problems such as dropping of the molding layer were not recognized in the defatting, dehydration and sintering steps.

The optical fiber preform thus prepared was about 70 mm in outer diameter. Bubbles were not recognized around the interface between the core glass rod and the cladding layer. The optical fiber prepared by drawing the preform thus prepared was found to be substantially equal in transmission properties to the single mode fiber prepared by the vapor phase method.

EMBODIMENT 6

A glass rod having a total length of 1450 mm was prepared by attaching a supporting glass rod having a diameter of 35 mm to each end of a core glass rod equal in its optical properties to that used in Embodiment 5. Then, a large porous preform having a length of 1200 mm was prepared by using the resultant glass rod as in Embodiment 5. In Embodiment 6, the molding pressure was set at 1.5 tons/cm$^2$ and the molding time was set at 1 minute. The porous preform thus prepared weighed about 11 kg.

The porous preform was subjected to degreasing, dehydrating and sintering treatments as in Embodiment 5 so as to obtain an optical fiber preform. Problems such as dropping of the molding layer were not recognized in the degreasing, purification (including dehydration) and sintering steps.

The optical fiber preform thus prepared was about 70 mm in outer diameter. Bubbles were not recognized around the interface between the core glass rod and the cladding layer. The optical fiber prepared by drawing the preform thus prepared was found to be substantially equal in transmission properties to the single mode fiber prepared by the vapor phase method.

COMPARATIVE EMBODIMENT 1

A porous preform about 70 mm in outer diameter and 580 mm in length was prepared as in Embodiment 5 except that a glass rod having a predetermined and uniform diameter was used in place of the core glass rod used in Embodiment 5. Also, an additional porous preform about 70 mm in outer diameter and 1000 mm in length was prepared as in Embodiment 5 except that a glass rod having a predetermined diameter was used in place of the core glass rod used in Embodiment 6. Each of these porous preforms was subjected to the degreasing, purification (including dehydration) and sintering treatments as in Embodiment 5 so as to obtain an optical fiber preform.

In this case, however, the bonding strength was insufficient between the core glass rod and the molding layer formed by using silica grains to cover the core glass rod. As a result, the molding layer was found to slide along the core glass rod in the degreasing step to remove the molding aid from the molding layer, the purification/dehydrating step to remove impurities from the molding layer and the sintering step. The slide was found to take place in at least 60% of the samples.

Further, the core glass rod was found to elongate in the sintering step. As a result, bubbles were found around the interface between the glass rod and the molding layer. Further, a region having an insufficient bonding strength was also found around the interface. A fiber prepared by drawing the resultant optical fiber preform was found to be inferior in its transmission properties to the single mode fiber prepared by the vapor phase method.

EXAMPLE 3

In the present invention, it is also possible to mount a rod member in a mold such that the end portions of the rod member project out of the loading portion of the powder within the mold. It is also possible to carry out the molding step such that the liquid pressure is also applied to the end face and side surface of the projecting portion of the rod member. The silica-based powder and the mold used in Example 3 are equal to those used in Example 2.

In the method of Example 3, a uniform pressure is isostatically applied to the rod member disposed at a predetermined position during the molding step, making it possible to prevent the rod member from being moved during the molding step. Also, a nonuniform stress is not applied to the rod member. As a result, the rod member is prevented from being made eccentric relative to the molding layer and from being broken. Naturally, the powdery portion of the molding layer is prevented from being damaged. It follows that the method according to Example 3 of the present invention makes it possible to manufacture an optical fiber preform with a high yield.

EMBODIMENT 7

Prepared was a rod member 62 consisting of a core glass rod 55 having a diameter of 14 mm and a length of 500 mm and a supporting glass rod 56 thicker than the core glass rod 55 and attached to each end of the core glass rod 55, as shown in FIG. 11A. The core glass rod 55 was prepared by a VAD method, which is a vapor phase method, had a core/clad ratio of 1:3 in terms of the outer diameter, and had a difference in refractive index, i.e., (core—clad)/core, of 0.35%.

In the next step, a lower rubber lid 57 having a hole in the central portion was engaged with a hole made in the central portion of the bottom of a cylindrical rubber mold 58 having an inner diameter of 110 mm, as shown in FIG. 11B. Then, a lower rubber lid 63 having a hole in the central portion was engaged with the hole of the lower rubber lid 57 for making the mold water-tight. Further, the supporting glass rod 56 forming one end portion of the rod member 62 was inserted into the hole of the lower rubber lid 63 so as to mount the rod member 62 along the axis of the rubber mold 58.

Further, silica grains 64 having an average diameter of about 80 $\mu$m were loaded within the rubber mold 58 while vibrating the mold, followed by engaging an upper rubber lid 60 having a hole in the central portion with the upper opening of the rubber mold 58, as shown in FIG. 11C. Then, an upper rubber lid 65 having a hole in the central portion was engaged with the hole of the rubber lid 60 for making the mold water-tight. Further, a supporting glass rod 56 forming the other end portion of the rod member 62 was inserted into the hole of the upper rubber lid 65. As a result, the rod member 62 was mounted such that the end portions thereof protrude from the region of the silica grains 64 loaded in the molding region defined by the rubber mold 58, the lower rubber lids 57, 63 and the upper rubber lids 60, 65. As shown in the drawing, the upper end face of the rod member 62 was aligned with the upper surfaces of the upper rubber lids 60, 65. Likewise, the lower end face of the rod member 62 was aligned with the lower surfaces of the lower rubber lids 57, 63.

Further, the entire mold was immersed in a pressure transmitting medium 67 housed in a pressure vessel 66 of a CIP apparatus, as shown in FIG. 11D. Water was used as the pressure transmitting medium. A liquid material other than water, e.g., a lubricating oil, can also be used as the pressure transmitting medium. Under the condition shown in the drawing, the pressure within the pressure vessel 66 was increased to a molding pressure of 1000 kg/cm$^2$, which was maintained for about 1 minute, followed by slowly lowering the pressure over a period of about 3 minutes from 200 kgf/cm$^2$ so as to obtain a porous preform having a diameter of about 90 mm, in which a molding layer was formed to cover the core glass rod 55 of the rod member 62. As described previously, the molding layer tends to be cracked when separated from the rubber mold in a low pressure region having a pressure not higher than 200 kg/cm$^2$. The slow pressure reduction described above was intended to prevent the cracking problem.

The porous preform thus prepared was free from breakage of the core glass rod 55. Also, no splitting or cracking was found in the molding layer consisting of the region of the silica grains 64 shown in FIG. 11C. Further, the deviation of the core glass rod 55 from the axis of the porous preform was less than 0.5%. It should be noted that a uniform pressure was applied isostatically to the rod member 62 during the molding step so as to prevent the rod member from being moved from the axis of the mold and from receiving a nonuniform stress during the molding step, leading to the prominent effects described above.

The porous preform thus prepared was defatted at 600° C. under the air atmosphere, followed by applying a purification/dehydrating treatment to the porous preform at 1250° C. under a helium gas atmosphere containing about 1% of chlorine gas. Further, the porous preform was sintered at 1600° C. under a helium gas atmosphere so as to vitrify the molding layer and, thus, to obtain a preform for an optical fiber. Defects such as bubble occurrence were not recognized at all around the interface between the core glass rod 55 and the molding layer of the optical fiber preform. An optical fiber prepared by drawing the optical fiber preform by the ordinary method was found to be substantially equal in properties to the single mode optical fiber prepared by the vapor phase method.

EMBODIMENT 8

Figure 12A:
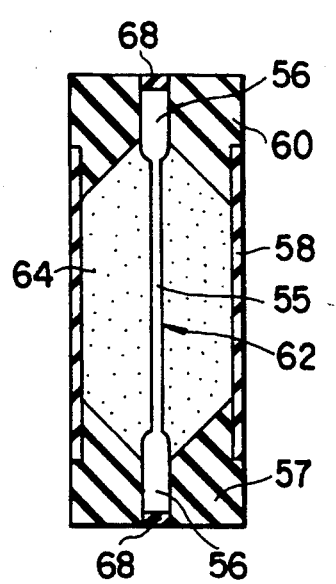
FIGS. 12A to 12C show molds and rod members used in the method of the present invention.

An optical fiber preform was manufactured substantially as in Embodiment 7, except that rubber stoppers 68 were used in place of the upper and lower rubber lids 65 and 63 included in the mold used in Embodiment 7. To be more specific, the mold used in Embodiment 8 consisted of a cylindrical rubber mold 58, a lower rubber lid 57 having a hole in the central portion and engaged with the lower opening of the rubber mold 58, and an upper rubber lid 60 having a hole in the central portion and engaged with the upper opening of the rubber mold 58, as shown in FIG. 12A. A supporting glass rod 56 at one end portion of the rod member 62 was inserted into the hole of the lower rubber lid 57 such that the end face of the supporting glass rod 56 reached an intermediate portion of the hole. Likewise, a supporting glass rod 56 at the other end portion of the rod member 62 was inserted into the hole of the upper rubber lid 60 such that the end face of the supporting glass rod 56 reached an intermediate portion of the hole. Further, the rubber stoppers 68 were inserted into the open regions of the holes made in the rubber lids 57, 60.

In this embodiment, a uniform pressure was applied isostatically to the end face and side surfaces of the rod member 62 via the rubber stoppers 68, the lower rubber lid 57 and the upper rubber lid 60, leading to prominent effects substantially equal to those in Embodiment 7.

EMBODIMENT 9

Figure 12B:
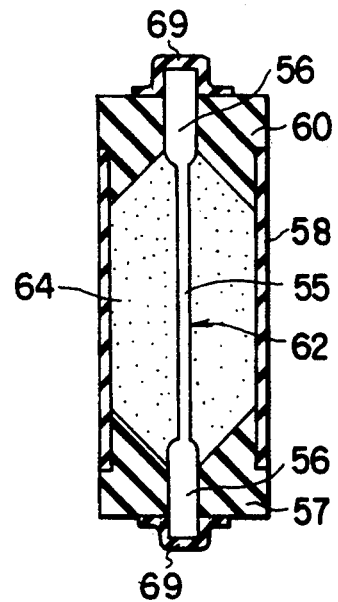

An optical fiber preform was manufactured substantially as in Embodiment 7, except that water-tight rubber sheets 69 were used in place of the upper and lower rubber lids 65 and 63 included in the mold used in Embodiment 7. To be more specific, the mold used in Embodiment 9 consisted of a cylindrical rubber mold 58, a lower rubber lid 57 having a hole in the central portion and engaged with the lower opening of the rubber mold 58, and an upper rubber lid 60 having a hole in the central portion and engaged with the upper opening of the rubber mold 58, as shown in FIG. 12B. A supporting glass rod 56 at one end portion of the rod member 62 was inserted into the hole of the lower rubber lid 57 such that the end face of the supporting glass rod 56 was positioned out of the hole. Likewise, a supporting glass rod 56 at the other end portion of the rod member 62 was inserted into the hole of the upper rubber lid 60 such that the end face of the supporting glass rod 56 was positioned out of the hole. Further, the projecting portions of the supporting glass rods 56 were covered with the water-tight rubber sheets 69.

In this embodiment, a uniform pressure was applied isostatically to the end face and side surfaces of the rod member 62, leading to prominent effects substantially equal to those in Embodiment 7.

EMBODIMENT 10

Figure 12C:
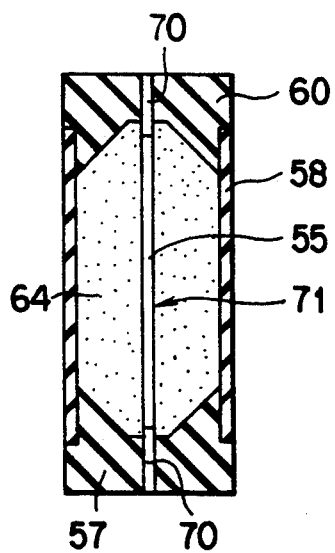

Used in this embodiment was a rod member 71 prepared by welding a supporting glass rod 70 to each end of a glass rod 55 equal to the core glass rod 55 used in Embodiment 7, as shown in FIG. 12C. As seen from the drawing, the supporting glass rod 70 was equal in diameter to the core glass rod 55.

An optical fiber preform was manufactured substantially as in Embodiment 7, except that the mold consisted of a cylindrical rubber mold 58, a lower rubber lid 57 engaged with the lower opening of the rubber mold 58 and having a hole in the central portion, and an upper rubber lid 60 engaged with the upper opening of the rubber mold 58 and having a hole in the central portion. The supporting glass rod 70 at one end portion of the rod member 71 was inserted into the hole of the lower rubber lid 57 such that the end face of the glass rod 70 was flush with the lower surface of the lower rubber lid 57. Likewise, the supporting glass rod 70 at the other end portion of the rod member 71 was inserted into the hole of the upper rubber lid 60 such that the end face of the glass rod 70 was flush with the upper surface of the upper rubber lid 60. Prominent effects substantially equal to those in Embodiment 7 were obtained in this embodiment.

COMPARATIVE EMBODIMENT 2

Figure 13:
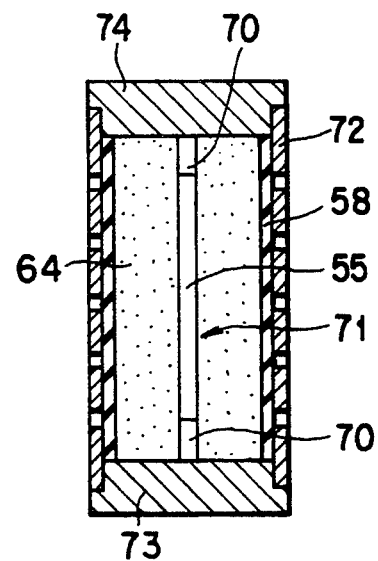
FIG. 13 shows a mold and a rod member used in the conventional method.

Used in this control case was a rod member 71 prepared by welding a supporting glass rod 70 to each end of a glass rod 55 equal to the core glass rod 55 used in Embodiment 7, as shown in FIG. 13. As seen from the drawing, the supporting glass rod 70 was equal in diameter to the core glass rod 55.

The mold used in this control case consisted of a cylindrical rubber mold 58, an auxiliary cylindrical metal pipe 72 disposed to cover the outer surface of the rubber mold 58 and provided with holes made in the side wall to permit passage of a pressure transmitting medium, a lower metal lid 73 engaged with the lower openings of the rubber mold 58 and the metal pipe 72, and an upper metal lid 74 engaged with the upper openings of the rubber mold 58 and the metal pipe 72. As shown in FIG. 13, the rod member 71 was mounted along the axis of the rubber mold 58.

A porous preform, which is used for manufacturing an optical fiber preform, was manufactured by using the molding apparatus of the construction described above under the conditions equal to those in Embodiment 7. The core glass rod 55 of the rod member 71 was broken in many cases, with the result that the molding layer consisting of the region of the silica grains 64 was damaged in as much as at least 70% of the samples.

Optical fiber preforms were manufactured substantially as in Embodiment 7 by using some of the porous preforms thus obtained. Many bubbles were found in the interface between the core glass rod 55 and the molding layer. Further, the optical fiber, which was manufactured by drawing the optical fiber preform by the ordinary method, was found to be inferior in properties to the single mode optical fiber manufactured by the vapor phase method.

EXAMPLE 4

The present invention also provides a method, comprising the steps of disposing a core material within a mold formed of an elastic material, loading a silica-based powder around the core material disposed within the mold, applying a molding pressure to obtain a porous preform consisting of the core material and a cladding material, and taking the porous preform from the mold by applying pressure to one end of the core material of the porous preform while applying a withdrawing force to the other end of the core material.

In this case, it is desirable for the end portions of the core material to be tapered such that the diameter of the core material is gradually diminished toward the end faces of the core material. Further, the tapered end portions of the core material should be brought into contact with the upper and lower lids. It is also desirable for the end portions of the cylinder portion of the mold to be tapered such that the inner diameter of the cylinder portion is gradually enlarged toward the edges of the cylinder portion. In this case, the outer side surfaces of the upper and lower lids of the mold should also be tapered to conform with the tapered end portions of the cylinder portion. Of course, the tapered portions of the upper and lower lids are brought into contact with the tapered end portions of the cylinder portion. The silica-based powder used in Example 4 is equal to that used in Example 2. Also, the mold used in Example 4 is substantially equal to that used in Example 2 except for the tapered regions used in Example 4.

FIG. 14 shows a mold 75 used in Example 4. As shown in the drawing, the mold 75 comprises an upper rubber lid 76, a lower rubber lid 78, and a cylinder portion 77. A porous preform 79 is loaded in the mold 75. Each of these upper and lower rubber lids 76, 78 is engaged with the cylinder portion 77 at the tapered region A. On the other hand, each of the side surfaces at the end portions of the core material 80 is engaged with the upper and lower rubber lids 76, 78 at the tapered region B. Each of the upper and lower rubber lids 76, 78 is provided with a recess C. A tool for removing the upper rubber lid 76 is engaged with the recess C of the upper rubber lid 76. On the other hand, the recess C of the lower rubber lid 78 permits the rubber mold to be dismantled easily.

The porous preform 79 is taken out of the mold as follows. In the first step, the upper rubber lid 76 of the mold 75 is removed. The upper rubber lid 76 can be removed very easily because the lid 76 is in contact with the upper end portion of the core material 80 at the tapered region B and is in contact with the cylinder portion 77 at the tapered region A. In the conventional technique, a powder tends to enter the clearance between the upper rubber lid 76 and the side surface at the upper end portion of the core material 80, with the result that a high resistance is generated when the upper rubber lid 76 is withdrawn from the mold. If the lid 76 is forcedly withdrawn, the core material tends to be broken and the porous preform tends to be damaged. However, the presence of the tapered regions permits eliminating the difficulty in the present invention.

Removal of the upper rubber lid 76 can be further facilitated by using a tool (not shown) engaged with the recess C formed in the upper rubber lid 76. In the case of using the tool, the porous preform 79 is prevented from damage when taken out of the mold.

After removal of the upper rubber lid 76, the porous preform 79 is pushed up by applying pressure to the lower end face of the core material 80 of the porous preform 79, as shown in FIG. 15. As shown in the drawing, a push-up machine 81 is used for applying pressure to the lower end face of the core material 80. An air pressure, hydraulic pressure or electrical means can be employed for applying pressure to the lower end face of the core material 80. In this step, it is desirable to apply a withdrawing force substantially equal to or smaller than the gravitational force applied to the porous preform 79 to the upper region of the core material 80 by using a pull-up machine 82. Naturally, the porous preform 79 can be taken out of the mold very easily by utilizing the push-up machine 81 and the pull-up machine 82, with the result that the stress applied to the core material 80 and the porous preform 79 can be diminished so as to prevent the porous preform 79 from being damaged.

EMBODIMENT 11

Silica grains having an average diameter of 8 $\mu$m were prepared by mixing 100 parts by weight of silica powder having an average diameter of 100 $\mu$m, 3 parts by weight of polyvinyl alcohol (PA-05 manufactured by Shinetsu Chemical K. K.) acting as a binder, and 67 parts by weight of pure water to prepare a slurry, followed by granulating the slurry by a spray-drying method.

On the other hand, prepared was a transparent glass core material having a core/clad ratio of $\frac{1}{3}$, a core/clad refractive index ratio of 0.3%. The core material was 9 mm in outer diameter, 400 mm in length and provided at both end portions with supporting rod portions each having an outer diameter of 20 mm and a length of 50 mm.

The core material 80 thus prepared was mounted along the axis of the rubber mold 75 having an outer diameter of 70 mm. The gradient of each of the tapered regions A and B referred to previously (see FIG. 14) was set at 3/100. Under this condition, the silica grains were loaded around the core material 80 while vibrating the rubber mold 75, followed by mounting the upper rubber lid 76 as shown in FIG. 14. Then, a hydraulic pressure of 1000 kg/cm$^2$ was applied to the rubber mold so as to form the porous preform 79.

After formation of the porous preform 79, a tool for removing the lid was engaged with the recess C of the upper rubber lid 76. The tool was moved upward while applying a slight rotary force to the upper rubber lid 76 so as to remove the upper rubber lid 76 as shown in FIG. 15. Then, an upward pressure of 5 kg/cm$^2$ was applied to the lower end face of the core material 80 by using an air cylinder (plunger diameter of 18 mm) while applying a pulling force substantially equal to the gravitational force applied to the porous preform 79 to the upper end portion of the core material 80 so as to take the porous preform 79 out of the rubber mold 75.

The porous preform 79 was then subjected to a degreasing treatment at 500° C. under the air atmosphere, followed by a dehydrating treatment at 1200° C. under a helium gas atmosphere containing 1% of chlorine gas. Further, a sintering treatment was applied by the ordinary method at 1600° C. under a helium gas atmosphere so as to obtain a transparent optical fiber preform having an outer diameter of 50 mm and a length of 270 mm.

The porous preform 79 was taken out of the mold in only 5 minutes as measured from the beginning of the operation to remove the upper rubber lid 76. Ten porous preforms were manufactured as above, with the result that a defective porous preform was not found at all.

COMPARATIVE EMBODIMENT 3

A porous preform was manufactured by using a conventional rubber mold and a conventional core material. The manufactured porous preform was taken out of the mold as follows. In the first step, the upper rubber lid was forcedly removed by using a screw driver, followed by pushing up the core material by using a wooden rod having a diameter of 18 mm so as to take the porous preform out of the mold. The time required for taking the porous preform out of the mold was found to be as much as 25 minutes as measured from the beginning of the operation to remove the upper rubber mold. Ten porous preforms were manufactured. However, 3 porous preforms were found to be defective and unsuitable for use in the manufacture of optical fiber preforms.

EXAMPLE 5

In the present invention, a glass supporting member having a diameter larger than the diameter of a core material may be attached to at least one end of the core material. In this case, pressure P (kgf/cm$^2$) should be set to meet formula I given below in the molding step:

$$P/(A/B) < 4000 \qquad \ldots \text{(I)}$$

where A is the cross sectional area of the core material, and B is the cross sectional area of the glass supporting member.

It is desirable to use silica glass for forming the glass supporting member.

A silica powder, a doped silica powder or the like can be used as the silica-based powder. It is desirable to use a silica powder manufactured by a vapor phase synthetic method or a high purity silica powder having a purity not lower than that of the silica powder manufactured by the vapor phase synthetic method. It is particularly desirable to use a granulated silica-based powder. In this case, the average diameter of the grains should desirably be not larger than 160 $\mu$m in order to achieve a reasonable loading density of the grains within the mold cavity.

As described above, the molding pressure P (kgf/cm$^2$) should be set to meet formula (I). If the value of P/(A/B) is not smaller than 4000, the core material having a glass supporting rod welded thereto tends to be broken. Particularly, the value in question should not exceed 3400.

Where a glass supporting member having a diameter larger than the diameter of a core material is attached to at least one end portion of the core material, the breakage of the core material in the compression molding step is affected by the stress applied to the junction between the core material and the glass supporting member. The magnitude of the stress is determined by the ratio in the cross sectional area of core material to the glass supporting member and by the molding pressure. For example, the stress to pull the core material is increased with increase in the ratio noted above. It follows that the breakage of the core material at the junction, which is caused by the stress, can be prevented by properly setting the particular ratio and the molding pressure, making it possible to manufacture a high quality porous preform. It is also possible to manufacture large optical fiber preforms.

EMBODIMENT 12

Figure 16:
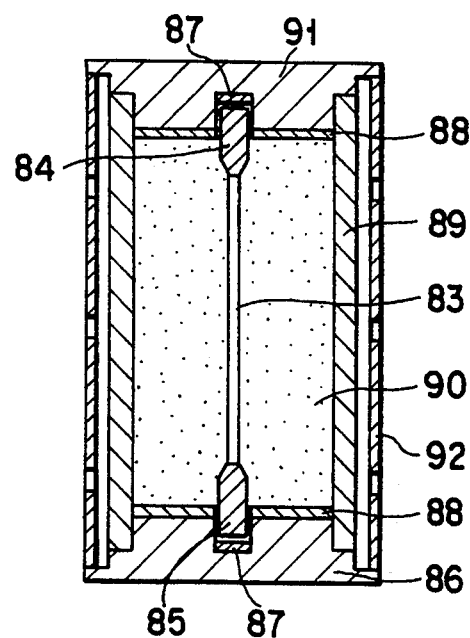

A transparent core glass rod 83 having a length of about 200 mm and an outer diameter of 10 mm was prepared by a VAD method. The core/clad ratio of the core rod was ¼. Then, a glass supporting rod 84 having a length of 50 mm and an outer diameter of 14 mm was welded to one end of the core rod 83, as shown in FIG. 16. Likewise, a glass supporting rod 85 having a length of 70 mm and an outer diameter of 14 mm was welded to the other end of the core rod 83.

In the next step, an elastic member 87, e.g., rubber, was arranged at the bottom of a concave portion of a lower rubber lid 86, followed by fixing a supporting plate 88 to the upper surface of the lower rubber lid 86 with an adhesive tape. Then, the glass supporting rod 85 was inserted into the concave portion of the lower rubber lid 86, followed by mounting a cylindrical rubber mold 89 having a length of 250 mm and an inner diameter of 50 mm to the lower rubber lid 86. The rubber mold 89 was fixed to the rubber lid 86 with an adhesive tape.

Figure 17A:
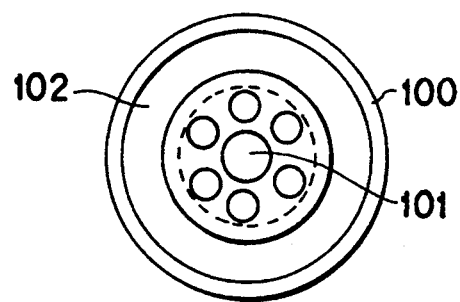
FIGS. 17A and 17B collectively show a tool used in the method of the present invention.
Figure 17B:
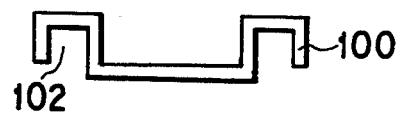

Further, a silica powder 90 was loaded in the cavity within the rubber mold 89 while vibrating the rubber mold 89. A tool 100 shown in FIGS. 17A and 17B was mounted to the rubber mold 89 in loading the silica powder 90. To be more specific, the glass supporting rod 84 was inserted into a central hole 101 of the tool 100, and the upper end portion of the rubber mold 89 was engaged with a concave portion 102 of the tool 100. Silica grains having an average diameter of about 100 μm were used as the silica powder loaded in the mold cavity. To be more specific, the silica grains were prepared by granulating a silica powder available on the market, which had been manufactured by the vapor phase synthetic method, and having an average particle diameter of about 8 μm.

After the silica powder loading step, the tool 100 was removed, followed by fixing a supporting plate 88 to the rubber mold 89. Then, an upper rubber lid 91 having an elastic member 87 arranged at the bottom of a concave portion was mounted to the rubber mold 89 such that glass supporting rod 84 was engaged with the concave portion of the upper rubber lid 91. The upper rubber lid 91 was fixed under this condition to the rubber mold 89 with an adhesive tape. Further, a two-part supporting cylinder 92 was mounted to cover the rubber mold 89. The resultant structure was put in a CIP apparatus (not shown), and a molding pressure of 750 kgf/cm² was applied to the mold. After the molding step, the rubber mold 89 was taken out of the CIP apparatus, and a porous preform was obtained by dismantling the rubber mold 89. Further, the porous preform was subjected to the degreasing and sintering treatments by the ordinary methods so as to obtain an optical fiber preform. The value of P/(A/B), where P is the molding pressure (kgf/cm²), and A and B are the cross sectional areas of the core material and the glass supporting rod, respectively, was 1470.

EMBODIMENTS 13 TO 21 AND COMPARATIVE EMBODIMENTS 4 TO 7

Optical fiber preforms were manufactured as in Embodiment 12, except that the outer diameter of the core rod 83 and the molding pressure were set as shown in Table 1. Table 1 also shows the moldability by using marks "o" and "x". The mark "o" denotes that the core material was not broken at the junction between the core rod 83 and the supporting glass rod 84 and/or 85. On the other hand, the mark "x" denotes that the core material was broken at the junction noted above.

TABLE 1

| | Diameter of Core Rod (mmφ) | Diameter of Supporting Rod (mmφ) | Molding Pressure (kgf/cm²) | *P/R | Moldability |
|---|---|---|---|---|---|
| Embodiment 12 | 10.0 | 14.0 | 750 | 1470 | o |
| Embodiment 13 | 10.0 | 14.0 | 1000 | 1960 | o |
| Embodiment 14 | 10.0 | 14.0 | 1250 | 2450 | o |
| Embodiment 15 | 10.0 | 14.0 | 1500 | 2940 | o |
| Embodiment 16 | 8.5 | 14.0 | 750 | 2035 | o |
| Embodiment 17 | 8.5 | 14.0 | 1000 | 2713 | o |
| Embodiment 18 | 8.5 | 14.0 | 1250 | 3391 | o |
| Embodiment 19 | 7.0 | 14.0 | 750 | 3000 | o |
| Embodiment 20 | 8.0 | 14.0 | 1250 | 3828 | o |
| Embodiment 21 | 9.0 | 14.0 | 1500 | 3630 | o |
| Comparative Embodiment 4 | 8.5 | 14.0 | 1500 | 4069 | x |
| Comparative Embodiment 5 | 7.0 | 14.0 | 1000 | 4000 | x |
| Comparative Embodiment 6 | 7.0 | 14.0 | 1250 | 5000 | x |
| Comparative Embodiment 7 | 7.0 | 14.0 | 1500 | 6000 | x |

*P/R denotes the value of P/(A/B), where P denotes the molding pressure (kgf/cm², and A and B denote the cross sectional areas of the core rod and the glass supporting rod, respectively.

As apparent from Table 1, the core rod is not broken at the junction between the core rod and the glass supporting rod in Embodiments 12 to 21, in which the value of P/R was smaller than 4000 as specified in the present invention. However, the core rod was broken at the junction noted above in the Comparative Embodiment cases where the value of P/R was larger than 4000.

EXAMPLE 6

In the present invention, it is also possible to use a holding apparatus comprising a mechanism for holding the mold and another mechanism for holding the rod member. The particular holding apparatus permits the rod member to be arranged substantially along the axis of the mold, and also permits the molding material to be loaded in the mold cavity under the particular condition. It is also possible to arrange the mold within a frame having an inner diameter substantially equal to the outer diameter of the mold. In this case, the mold is stably held within the frame, and the molding material can be loaded into the mold cavity with the relative positions of the frame and the rod member held stationary.

Since the holding apparatus permits the rod member to be arranged substantially along the axis of the mold, the relative positions of the rod member and the mold are held stationary. In the present invention, the molding material is loaded into the mold cavity under the particular condition, with the result that the relative positions of the mold and the rod member are left unchanged in the cases where the molding material is loaded while vibrating the entire loading device and where the molding material is loaded while ramming the loaded portion of the molding material. It follows that it is possible to prepare a uniform porous preform having the rod member positioned along the axis of the porous preform without fail, leading to the manufacture of an optical fiber substantially free from deviation of the core.

EMBODIMENT 22

Figure 18:
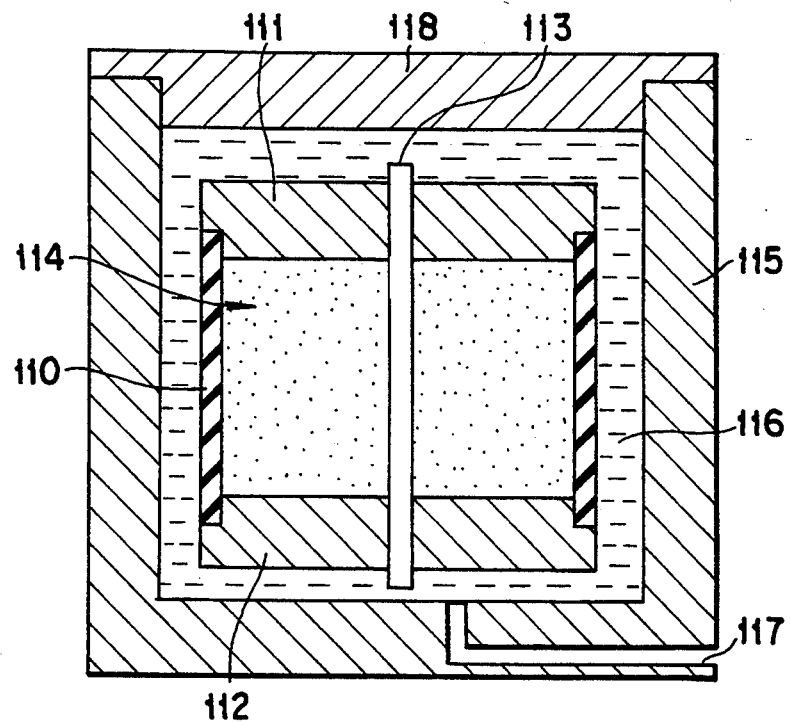

FIG. 18 shows an apparatus used for working the method according to Example 6 of the present invention. As shown in the drawing, a molding material 114 is loaded within a mold cavity defined by a mold 110, an upper rubber lid 111 and a lower rubber lid 112. A rod member 113 is arranged along the axis of the mold 110, and the molding material is loaded around the rod member 113. A pressure transmitting medium 116 housed in a pressurizing region defined by a vessel 115 and an upper lid 118 is pressurized by a pressure-applying system (not shown) including a pump through a passageway 117 of the pressure transmitting medium. The mold 110 is cylindrical, and each of the upper and lower rubber lids 111, 112 is circular and is provided in the central region with a hole through which the rod member 113 extends. To prevent the pressure transmitting medium 116 from entering the inner space of the mold 110, the hole made in the upper rubber lid 111 or lower rubber lid 112 should be completely closed by the rod member 113. Thus, the upper or lower end portion of the rod member 113 may be covered, if necessary, with a plastic sheet or a thin rubber film.

Figure 19:
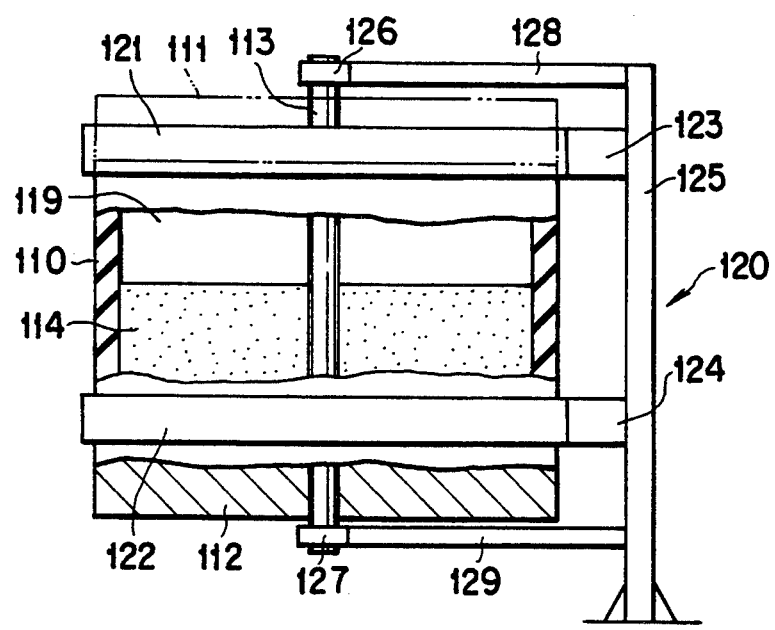
FIG. 19 shows how the molding material is loaded in the cavity of a mold in the method shown in FIG. 18.

FIG. 19 shows how to load the molding material 114 in a mold cavity 119. As shown in the drawing, the mold 110 and the rod member 113 are held by a holding device 120. Specifically, the mold 110 is held by upper and lower chucks 121, 122 which are fixed to a supporting rod 125 via arms 123, 124. On the other hand, the rod member 113 is held by upper and lower chucks 126, 127 which are fixed to the supporting rod 125 via arms 128, 129. Each of these chucks, arms and supporting rod is formed of a metal or a material having a rigidity not lower than that of the metal. The arm is provided with a mechanism for controlling the length or angle to permit the rod member to be arranged along the axis of the mold cavity.

The molding material is supplied from a supply device (not shown) into the mold and loaded in the mold cavity. In the loading step, the entire apparatus shown in FIG. 19 can be vibrated, i.e., so-called "tapping", if necessary. Various other methods can also be employed for uniformly loading the molding material.

After completion of the loading, the chuck 126 is removed, followed by mounting the upper rubber lid 111. Then, the chucks 121, 122 and 127 are removed in preparation for the pressurizing step shown in FIG. 18.

It is desirable to mount the mold within a frame having an inner diameter substantially equal to the outer diameter of the mold in order to prevent, for example, the rubber mold 111 from being expanded in the longitudinal direction. For example, a metal cylinder can be used as such a frame. The frame permits the rod member to be arranged along the axis of the mold more accurately. In the compression molding step, the frame is removed. Thus, it is desirable for the cylindrical frame to be capable of division into two parts.

EXAMPLE 7

In the present invention, it is possible to use a detecting device for detecting the position of the core glass rod member in the loading step of the molding material. In this case, the position of the core glass rod is adjusted on the basis of the result of the detection.

For example, the center of the core glass rod is observed from above the core glass rod with, for example, a video camera used as a detecting device, and the information thus obtained is displayed on a monitor. The position of the core glass rod is adjusted in accordance with the detection result of the detecting device. In this case, it is desirable to feed the obtained information back to the holding mechanism of the core glass rod so as to keep the core glass rod held in the center of the mold.

The detecting device is effective for preventing the core glass rod from being made eccentric relative to the cladding layer in the molding step of the powdery raw material. Naturally, an optical fiber preform having the core rod member positioned accurately in the center can be obtained after the degreasing and sintering treatments applied to the resultant porous preform.

A TV camera, a fiber scope, a CCD camera, etc. can also be used as a means for detecting the position of the core glass rod. For adjusting the position of the core glass rod, the axis of the mold is determined on a monitor and the displacement of the core glass rod from the mold axis is manually adjusted by a micrometer mounted to each of the X-axis and Y-axis of the holding mechanism of the core glass rod. It is also possible to feed the information on the position of the core glass rod back to a stepping motor mounted to each of the X-axis and Y-axis of the holding mechanism for driving these stepping motors to automatically control the position of the core glass rod.

Figure 20:
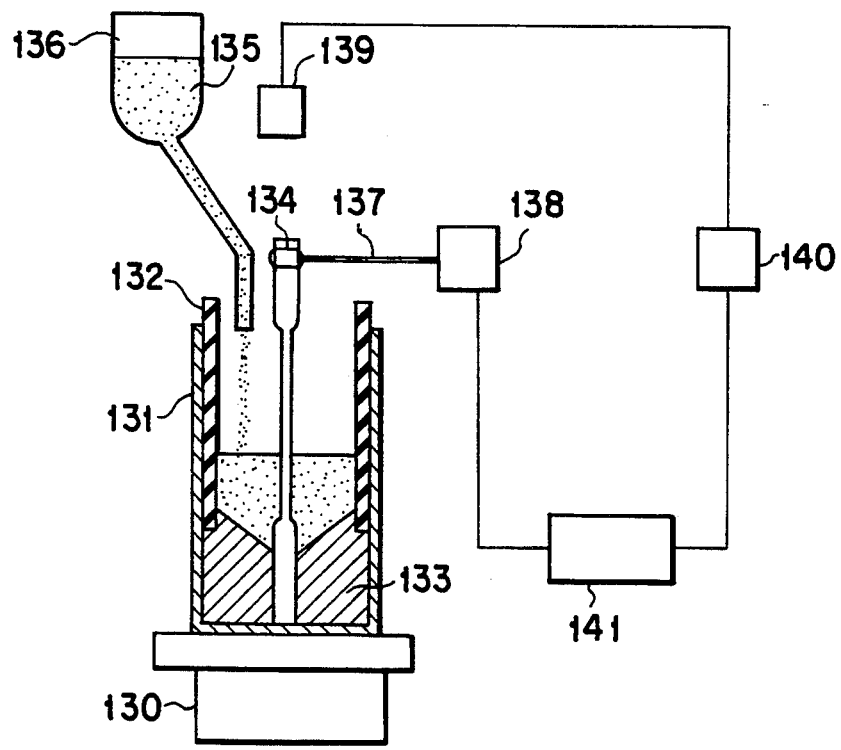

FIG. 20 exemplifies the method described above. As shown in the drawing, a rubber mold supporting cylinder 131 having a rubber mold 132 inserted therein is disposed on a vibrator 130. The rubber mold 132, having outer diameter as large as inner diameter of the cylinder 131, is disposed in the cylinder 131. Thus, the rubber mold 132 is supported by the cylinder 131 with a high degree of verticality. A lower rubber lid 133 is disposed in the rubber mold 132. The lower end portion of a core rod 134 is inserted into the lower rubber lid 133, and the core rod 134 extends along the axis of the rubber mold 132. Further, a hopper 136 having a silica raw material 135 housed therein is disposed above the supporting cylinder 131.

Figure 21:
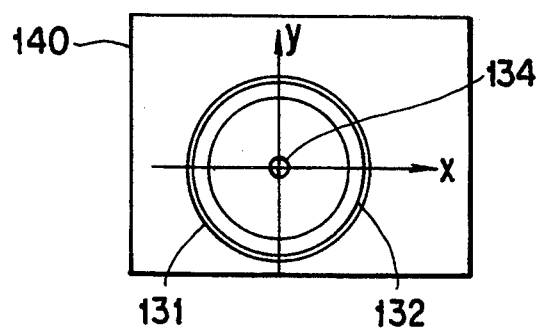
FIG. 21 shows an indication of a monitor used in the method shown in FIG. 20.

The upper end portion of the core rod 134 is held by an arm 137 which is connected to an XY stage 138, with the result that the upper end portion of the core rod 134 can be moved by operating the XY stage 138. A TV camera 139, which is connected to a monitor 140, is disposed above the core rod 134. As shown in FIG. 21, the displacement of the core rod 134 from the axis of the rubber mold 132 is monitored on the monitor 140. Also, the monitor 140 is provided with a position detecting mechanism, and an electric signal denoting the amount of displacement of the core rod 134 can be generated from the monitor 140. The monitor 140 is connected to a control system 141 of the XY stage 138. The electric signal generated from the monitor 140 is supplied to the control system 141. Upon receipt of the electric signal, the control system 141 generates a control signal, which is supplied to the XY stage 138. As a result, the upper end portion of the core rod 134 is controlled to be positioned accurately as desired.

In the step of supplying the silica powder 135 from the hopper 136 into the rubber mold 132, the vibrator 130 is operated to vibrate the rubber mold 132. As a result, the loading density of the silica powder can be increased, and the raw material can be loaded with a uniform loading density. In the loading step, the core rod 134 is possibly deviated from the axis of the mold. In the present invention, however, the position of the core rod 134 is observed by the TV camera 139, and the position is detected by the monitor 140 having a position detecting function. Further, the XY stage 138 is driven by the control system 141 based on an electric signal denoting the position of the core rod 134, said electric signal being generated from the monitor 140. It follows that the core rod 134 can be positioned accurately along the axis of the rubber mold 132 regardless of vibration of the rubber mold 132 throughout the loading step of the silica powder.

After the loading step, the rubber mold 132 is taken out of the supporting cylinder 131 and put in, for example, a CIP apparatus for applying a molding pressure to the powder so as to obtain a porous preform. As described above, the core rod is prevented from being deviated from the axis of the mold in the raw material loading step, with the result that the deviation of the core rod is negligibly small in the porous preform. Further, the deviation of the core is also negligibly small in the optical fiber manufactured from the porous preform.

Incidentally, the correction in the position of the core rod 134 is required particularly in the initial stage of the raw material loading step. In other words, the deviation of the core rod is not serious after the middle stage of the loading step. Further, the TV camera for observing the position of the core rod can also be used for inspecting the dimensional accuracy of the rubber mold 132 seriously affecting the deviation of the core of an optical fiber such as roundness and uniformity in thickness of the rubber mold and the position of the central hole made in the lower rubber lid of the rubber mold. In other words, both inspection and control in the position of the core material can be performed by a single device, making it possible to prevent the deviation of the core more effectively.

In the loading step of the silica powder, the core rod is also vibrated because the rubber mold is vibrated in the loading step, with the result that the the picture image displayed on the screen of the monitor 140 tends to be vibrated. In such a case, it is desirable to apply a picture image treatment in accordance with the vibrating frequency to determine the accurate position of the core rod. It is also possible to carry out alternately measurement-correction of the core rod position and loading-vibration repeatedly. Incidentally, measurement-correction should not be carried out during the loading-vibration step.

EMBODIMENT 23

Raw material grains having an average diameter of 100 $\mu$m were prepared by adding 3 parts of polyvinyl alcohol (PA-05 manufactured by Shinetsu Kagaku K. K.) and 67 parts of pure water to 100 parts of a silica powder having an average particle diameter of 8 $\mu$m to form a slurry, followed by granulating the slurry by a spray-drying method.

On the other hand, a core rod having a core/clad ratio of $\frac{1}{3}$ and a difference in the refractive index between the core and the clad of 0.3%, said core rod having an outer diameter of 9 mm and a length of 300 mm, was prepared by a VAD method, followed by applying a dehydrating treatment and a sintering treatment to the rod to make the rod transparent.

The lower end portion of the core rod thus prepared was inserted into the lower rubber lid 133 of the rubber mold 132 shown in FIG. 20. Then, the raw material grains 135 were supplied from the hopper 136 into the mold 132 while vibrating the mold by operating the vibrator 130. In the loading step, the position of the core rod was controlled by the system described previously.

After the loading step, the upper portion of the rubber mold was covered with an upper rubber lid (not shown), followed by taking the rubber mold 132 out of the supporting cylinder 131. Then, the rubber mold was set in a CIP apparatus, and a hydraulic pressure of 1000 kg/cm$^2$ was applied to the mold to prepare a porous preform having an outer diameter of 60 mm and a length of 300 mm.

The porous preform was subjected to a degreasing treatment at 500° C. for 5 hours under the air atmosphere, followed by applying a dehydrating treatment by the ordinary method under a helium gas atmosphere containing 1% of chlorine gas. Further, a sintering treatment was applied by the ordinary method at 1600° C. under a helium gas atmosphere so as to obtain an optical fiber preform having an outer diameter of 50 mm and a length of 270 mm. An optical fiber was manufactured by drawing the optical fiber preform. Displacement of the core from the axis of the optical fiber was found to be only 0.1 $\mu$m.

Ten optical fiber preforms were manufactured by the method described above, followed by similarly manufacturing optical fibers from these preforms. Displacement of the core from the axis of the optical fiber was found to be 0.3 $\mu$m or less in any of these optical fibers.

COMPARATIVE EMBODIMENT 8

Ten porous preforms were manufactured as in Embodiment 23, except that the apparatus used was not provided with the system for monitoring the position of the core rod. When optical fibers were manufactured by using the porous preforms thus prepared, displacement of the core of the optical fiber was found to be nonuniform within a range of between 0.2 $\mu$m and 1.0 $\mu$m, clearly indicating a practical problem.

As described above, the method of the present invention permits preparing a porous preform free from splits and cracks, making it possible to obtain a high quality optical fiber preform free from bubbles with a high efficiency.

In the embodiments described above, a porous preform consisting of a silica-based powder was prepared, followed by manufacturing a preform for an optical fiber from the porous preform. However, the method of the present invention can also be employed for manufacturing preforms for an image fiber, a light guide and a rod lens.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. A method of manufacturing an optical fiber preform, comprising the steps of:

disposing a rod member made of a silica-based material within a cavity of a mold, followed by loading a molding material within the mold cavity;

pressuring the mold from outside of the mold to form a porous layer on the surface of the rod member and, thus, to obtain a porous preform;

wherein at least one end portion of the rod member extends outside the mold cavity in the step of pressurizing the mold;

mechanically taking the porous preform out of the mold by pressuring an end portion of the rod member; and applying pressure to one end of the rod member while applying a withdrawing force to another end portion of the rod member in the step of taking the porous preform out of the mold.

2. The method of manufacturing an optical fiber preform according to claim 1, wherein:

said rod member has a tapered portion at an end portion thereof such that the diameter of the rod member is diminished toward an end face thereof, and the rod member abuts against the mold at the tapered portion thereof.

3. A method of manufacturing an optical fiber preform, comprising the steps of:

disposing a rod member made of a silica-based material within a cavity of a mold, followed by loading a molding material within the mold cavity;

pressurizing the mold from outside of the mold to form a porous layer on the surface of the rod member and, thus, to obtain a porous preform;

wherein at least one end portion of the rod member extends outside the mold cavity in the step of pressurizing the mold;

attaching a supporting member larger in diameter than the rod member to at least one end of the rod member, the supporting member and the rod member each having a respective cross sectional area; and setting a molding pressure P in said pressurizing step to meet formula (I) given below:

$$P/(A/B) < 4000 \qquad \ldots (I)$$

where A is the cross sectional area of the rod member, and B is the cross sectional area of the supporting member.

* * * * *